United States Patent
Gordon et al.

(10) Patent No.: US 7,381,163 B2
(45) Date of Patent: Jun. 3, 2008

(54) CLOSED-LOOP FORCE CONTROLLED BODY WEIGHT SUPPORT SYSTEM

(75) Inventors: Keith Gordon, Ann Arbor, MI (US); Bjorn Svendesen, Stevensville, MI (US); Susan J. Harkema, Culver City, CA (US); Sam El-Alami, Wichita, KS (US)

(73) Assignee: The Regents of the University of California, Oakland, CA (US)

( * ) Notice: Subject to any disclaimer, the term of this patent is extended or adjusted under 35 U.S.C. 154(b) by 418 days.

(21) Appl. No.: 10/278,490

(22) Filed: Oct. 22, 2002

(65) Prior Publication Data

US 2003/0153438 A1    Aug. 14, 2003

Related U.S. Application Data

(60) Provisional application No. 60/339,081, filed on Nov. 5, 2001, provisional application No. 60/350,164, filed on Oct. 24, 2001.

(51) Int. Cl.
  *A61H 3/00* (2006.01)
(52) U.S. Cl. .......................................... 482/69; 601/23
(58) Field of Classification Search ................. 482/66, 482/68, 148; 601/5, 23, 34–5
See application file for complete search history.

(56) References Cited

U.S. PATENT DOCUMENTS

| 4,973,044 | A | * | 11/1990 | Jones | 482/51 |
| 5,050,590 | A | * | 9/1991 | Futakami | 601/23 |
| 5,242,339 | A | * | 9/1993 | Thornton | 482/8 |
| 5,372,561 | A | * | 12/1994 | Lynch | 482/54 |
| 5,662,560 | A | * | 9/1997 | Svendsen et al. | 482/69 |
| 5,695,432 | A |   | 12/1997 | Soderlund |  |
| 6,256,372 | B1 | * | 7/2001 | Aufrichtig et al. | 378/41 |
| 6,273,844 | B1 | * | 8/2001 | Kelsey et al. | 482/54 |
| 6,454,679 | B1 |   | 9/2002 | Radow |  |
| 6,689,075 | B2 | * | 2/2004 | West | 601/23 |

* cited by examiner

*Primary Examiner*—LoAn H. Thanh
*Assistant Examiner*—Allana Lewin
(74) *Attorney, Agent, or Firm*—Berliner & Associates

(57) ABSTRACT

A body weight support system that monitors and controls the level of support force within a stepcycle to result in normative center of mass movement and ground reaction forces. The system comprises a harness connected to a lift line which in turn is connected to a means for advancing and retracting the lift line. A control system is configured to monitor load on the cable and to regulate lift line advancement and retraction in response to load information. The support system can be combined with a treadmill for locomotor training of a subject.

7 Claims, 1 Drawing Sheet

CLOSED-LOOP FORCE CONTROLLED BODY WEIGHT SUPPORT SYSTEM

CROSS-REFERENCE TO RELATED APPLICATIONS

This application is based on provisional application No. 60/350,164, filed on Oct. 24, 2001, and provisional application No. 60/339,081, filed on Nov. 5, 2001.

STATEMENT REGARDING FEDERALLY SPONSORED RESEARCH OR DEVELOPMENT

This invention was made with Government Support under Grant No. SH33809 and Grant No. SH33836 awarded by the National Institutes of Health. The Government has certain rights in this invention.

BACKGROUND

1. Field of Invention

This invention relates generally to a support system for continually providing controlled body weight support during running, walking or standing, and in particular, to a support system for use in locomotor training.

2. Related Art

There is a need to create an environment where the amount of force on the lower body is reduced during walking, running or standing, for applications such as athletic training, orthopaedic and neurologic rehabilitation, virtual reality studies and general scientific investigations. This type of environment has been used in studies of astronaut maneuverability during space travel, in gait rehabilitation for neurologic and orthopaedic disorders—where the amount of load on the patients lower body is reduced to provide the subjects with enough support to allow them to stand and step with minimal outside assistance—and in basic science studies to understand how load bearing and gravity affect the mechanical and neurological systems of biological beings.

Several different methods have been used to reduce body weight load during gait. For example, one method includes an underwater treadmill and an adjustable ballasting harness to examine peak ground reaction forces, stride frequency and energy requirements during gait in reduced gravities (20). This water immersion technique has also been used to evaluate the ability of astronauts to perform several tasks in reduced gravity (22). The use of water immersion can be limited by factors including the need to supply a breathing apparatus to subjects, the effects of drag caused by water and the need for special equipment to function underwater.

Another method of creating reduced gravity is to have an aircraft fly a Keplerian trajectory (19). By repeating this flying maneuver and altering the parameters of the trajectory, uniform reduced gravity levels between 0 and 1 gravity, can be obtained for periods up to 30 seconds. This method has been successfully used to measure the pendulum like exchange of potential and kinetic energy during gait at different gravities (3,4). Parabolic flight has an advantage over most reduced gravity simulation techniques in that it places a body force over every particle within a body. In addition, subjects can move with six degrees of freedom and are not restrained by a framework or by a liquid-imposed drag. However the usefulness of parabolic flight is limited due to the very short periods of reduced gravity that are created, and the difficulty, expense and expertise needed to create this environment.

An overhead suspension system is a very popular, inexpensive and simple alternative to water immersion or parabolic flight for the creation of a reduced gravity environment. The suspension system can be as complex as having a subject walking in a supine or horizontal position on a treadmill, with support cables that attach to the trunk, head and individual limb segment and run to an over head counter weight system (6,16), to as simple as having a bicycle saddle attached to a series of stretched springs that when straddled during upright treadmill walking, provides an upward force to the subject (15).

The stretched spring suspension method has been used to study several principles of human gait in reduced gravity including; leg stiffness (15), energetics (10), walk-run transition speeds (17), dynamic similarity (9), gravitational and inertial forces on ground reaction force, mechanical energy fluctuations and exchanges (13) and application of horizontal force on ground reaction force (5). However using a stretched spring as a means of support during walking is limited because of the inherent movement of a person's center of mass during locomotion. Errors in the stretched spring system are attributed to stretching of the spring during gait and frictional forces caused by rubbing motions of the cable.

Several other groups have used variations of upright suspension body weight support systems to study the control of locomotion in humans and to provide locomotor training, a new rehabilitation approach to the recovery of walking after neurologic and orthopaedic injury (7,23).

In locomotor training, a spinal cord injured subject is suspended in a harness above a treadmill, and manual assistance is provided to move the subject's legs in a walking pattern. The key characteristics of this technique are partial unloading of the limbs and assistance of leg movements during stepping on the treadmill. The goal of this technique is to enhance residual locomotor control circuitry that resides in the spinal cord (2).

Many of the subjects undergoing locomotor training are unable to support their entire bodyweight on their own. Because of this, the role of the body weight support device in motor control studies and in locomotor training is to provide subjects with enough support to allow them to stand and step with minimal outside assistance.

In one body weight support system used for locomotor training, the subject wears a harness, similar to a parachute harness, to support the subject vertically in a standing position (1). The lift to the harness is provided by an overhead electric motor using a gearbox and a slip gear manually controlled by an operator. A similar body weight support system uses an overhead motorized lift to support spinal cord injured subjects during stepping on a treadmill with manual assistance (14). Due to the inherent movement of a subject's center of mass, the amount of support force provided to the subject in this very stiff system will vary widely based on the position of subject. For example, because of the stiff position control of the system, during walking, when a subject's center of mass is at its greatest vertical amplitude at midstance, the amount of support provided by the system is decreased in comparison to the amount of support occurring at heel strike, when the subject's vertical center of mass is the lowest.

In spite of these limitations of the overhead electric motor system, several key principles of gait control in spinal cord injured subjects were discovered in studies that utilized this system. First, for spinal cord injured subjects stepping with bodyweight support and manual assistance, mean electromyography (EMG) amplitudes in the soleus, medial grastrocnemius and tibialis anterior are directly related to the peak load during each step (14). Second, spinal cord injured subjects stepping with a similar set up had higher mean EMG amplitudes as treadmill speed increased (21). These results indicate that sensory information from both kinetic and kinematic factors, including movement of the center of mass and ground reaction forces similar to that during normal locomotion, are vital in creating appropriate motor outputs.

Counterweights are another method used to provide a lift to a subject via a support harness during locomotor training. This type of counterweight bodyweight support system was employed to study the relationship between EMG activity in spinal cord injured subjects during stepping, and the level of their lesion (8). The counterweight system is very limited in its ability to provide a constant support force because, as a subject's center of mass moves during walking, the inertial factors of a counter weight tethered to a moving object will cause fluctuations in the amount of support the subject is receiving, thus affecting both center of mass movement and ground reaction forces.

One way to allow center of mass movement during the unloading of body weight while stepping is to use a pneumatic cylinder with a support harness to provide lift to a subject (11). Results suggest that the mean ground reaction force is reduced comparably to the level of body weight support. However, the manner in which the ground reaction force is reduced is not consistent across the force time curve because there is no feedback control. The result is abnormal center of mass movement and ground reaction forces.

A detailed description of a pneumatic system whose aim is to provide a constant support lift to the subject has been presented by Gazzani (12). This system has an error in support force of less than 10% and in general, for the parameters of use (level of support and speed of walking) encountered in clinical practices, the error is less than 5%. The pneumatic system of Gazzani is an improvement over other systems because of its closed looped nature. However, the system is limited because the system is closed by taking solely measurements of pressure inside the pneumatic cylinder and does not obtain measurements of forces exerted on the individual. Further, the characteristics of these pressures do not necessarily represent the effect on the ground reaction forces exerted on the individual, which are ultimately the values that need to be maintained at normative values for effective locomotor training interventions.

Fluctuations in the level of body weight support force in all the upright overhead body weight support systems would seem to be caused primarily by vertical movements of the subject during locomotion. The following equation accounts for the error in support force seen in the pneumatic system of Gazzani:

$$\text{Error} = \pm F + K^*X + B^*V + M^*A$$

where F is pure friction, K is stiffness, B is viscous drag, M is moving masses, X is vertical position, V is vertical velocity and A is vertical acceleration (12).

Controlling fluctuations in the level of support force in relation to the effect on the ground reaction forces are of central importance for basic science applications to the understanding of human locomotion and for locomotor training following neurologic disorders or orthopaedic injury. For neurologically or orthopedically impaired patients to safely use locomotor training as a form of rehabilitation, it is essential that the amount of loading they experience is both known and controllable. Moreover, several animal and human studies on the control of locomotion suggest a significant level of recovery can occur, even when supraspinal input is severely compromised or absent, by providing appropriate sensory information related to locomotion. One very important piece of sensory information is limb loading during stepping (7,14). The level of bodyweight support force exerted on a patient during locomotor training will directly influence the amplitude and manner in which the limb is loaded. The amount and pattern of support force through out the gait cycle, will affect the amplitude and pattern of the ground reaction forces during stance and thus should be controlled to represent those observed during over ground walking.

SUMMARY

It is an object of the present invention to control the fluctuations in the level of support force supplied to a subject undergoing locomotor training. Another aim of the present invention is to control the level of support force so that center of mass movements and ground reaction forces normally encountered in walking are maintained during locomotor training.

The present invention provides a closed-loop body weight support system that is useful in basic research and clinical environments where humans desire to walk, run or stand at levels of support less than their total body weight. The support system comprises a harness attached to the load bearing end of a lift line. The lift line is connected in turn to a means for advancing and retracting the lift line, such as a pneumatic or hydraulic cylinder, or a motor. A control system is configured to monitor load on the lift line and in response to load information, to regulate lift line advancement and retraction, thereby controlling the amount of support provided to a subject placed in the harness. A frame provides structural support for the system. The system has the advantage of continually monitoring and controlling the actual level of support a subject receives.

The lift line can be a cable, rope, cord, strap or the like. Preferably, the lift line is a cable. Further, the advancing and retracting means is preferably a pneumatic or hydraulic cylinder.

In particular embodiments, the advancing and retracting means is physically moveable relative to the frame. Preferably, the means is moveably mounted to the frame. A servo motor can be added to the system for moving the advancing and retracting means.

The control system can comprise a load sensor, an activator for activating the advancing and retracting means, and a controller receiving load information from the sensor and in response, sending control signals to the activator. The load sensor is preferably a load cell. The type of activator depends on the nature of the advancing and retracting means. Where the means is a hydraulic or pneumatic cylinder, the activator is a valve; where the means is a motor, the activator is a switch. The controller can be a suitably programmed computer.

A moveable surface can be included for locomotor training. The moveable surface can be provided by a treadmill, conveyor belt, moving walkway or the like. In practice, the surface can be located so as to be below and adjacent, or touching, one or both feet of a subject. A stationary surface such as a floor can also be employed, although in this case, the support system must move as the subject steps.

A moveable surface can be included for locomotor training. The moveable surface can be provided by a treadmill, conveyor belt, moving walkway or the like. In practice, the surface can be located so as to be below and adjacent, or touching, one or both feet of a subject.

The present invention is further directed to a method of providing controlled support to a subject, which comprises the steps of suspending the subject by a lift line, monitoring the subject's load on the lift line, and automatically controlling lift line extension and retraction in response to monitored load information. Used with a moving surface, the method is particularly relevant to locomotor training.

The novel features which are believed to be characteristic of the invention, both as to its organization and method of operation, together with further objects and advantages will be better understood from the following description when considered in connection with the accompanying FIGURE. It is to be expressly understood, however, that the FIGURE is provided for the purpose of illustration and description only and is not intended as a definition of the limits of the present invention.

DETAILED DESCRIPTION

Figure 1:
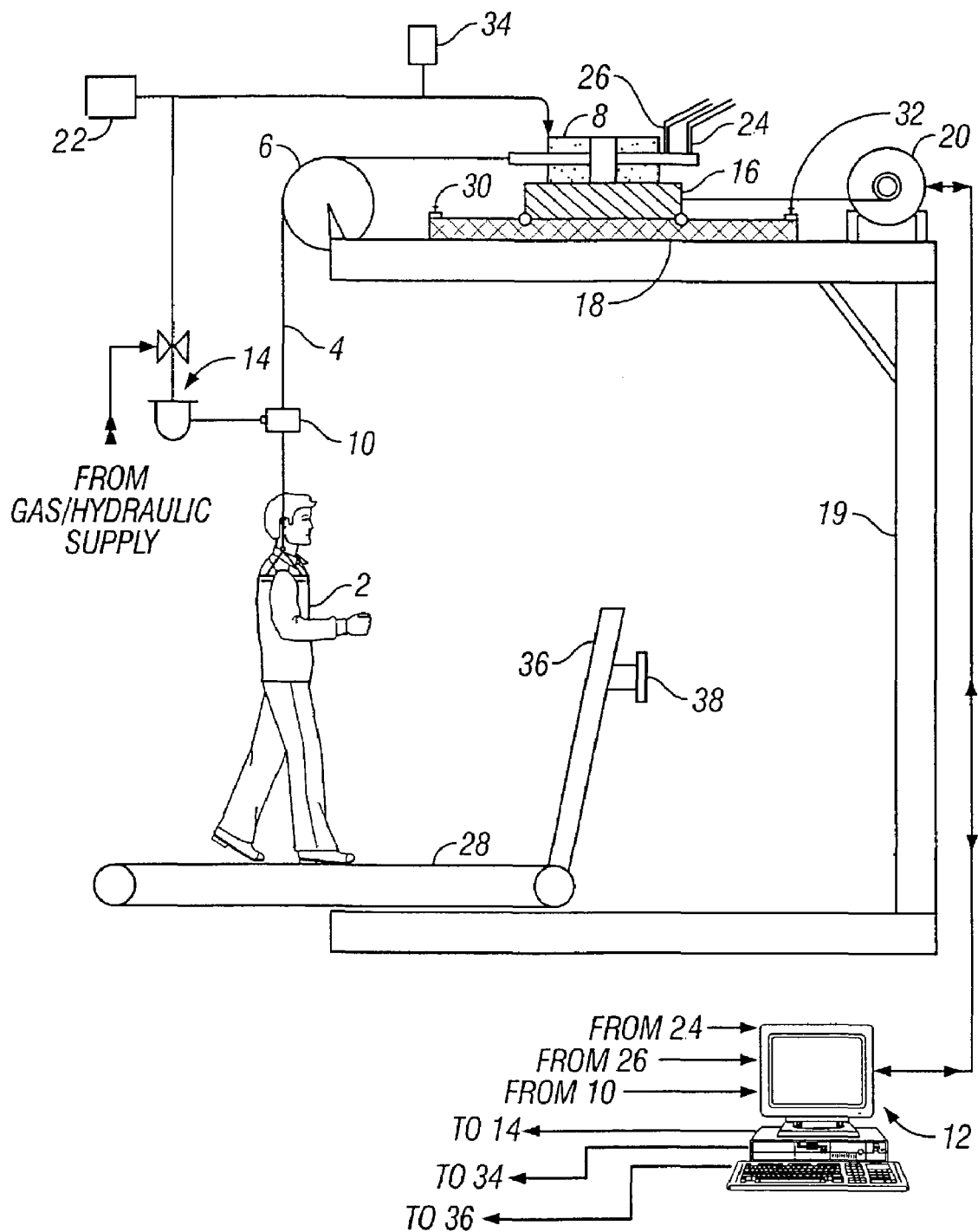
FIG. 1 is a sketch of a subject walking on a treadmill while being supported by a closed-loop body weight support system in accordance with the present invention.

Referring to a particular embodiment in FIG. 1, a user wears a suitably modified parachute harness 2 that is attached to an overhead cable 4. The cable in turn runs vertically up over a pulley 6 and attaches to a double rod control cylinder 8. When pressure is supplied to the cylinder via a compressed air/gas/hydraulic supply (not shown), the cylinder compresses. This cylinder compression via the overhead cable creates an upward force applied to the subject. The upward force can be regulated by supplying or exhausting air, gas or hydraulic fluid to or from the cylinder. In preferred embodiments, the cylinder is operated with compressed air/gas.

A load cell 10 is placed in series with the cable 4. The load cell sends feedback about the subject's present level of support force to a computer 12. A computer program continually compares the present level of support force to a manually selected desired level of support force. Information from the computer is sent to an electrical pneumatic/gas/hydraulic control valve 14. The electrical pneumatic/gas/hydraulic control valve 14 will modify the amount of flow into and out of the cylinder depending on whether the present level of support is greater than or less than the desired level.

The cylinder 8 is mounted on an adjuster plate 16 that is slidably connected to a guide track 18 which is mounted to a frame 19. The sliding adjuster plate 16 is moved by a servo motor 20 that sends feedback to and receives control from the computer 12. By mounting the cylinder 8 to the sliding adjuster plate 16 the position of the cylinder can be moved. This has several advantages. First the cylinder can be positioned during walking, running and standing situations to maximize the range of motion allowed by the subject. Second, the cylinder can be moved such that the cable will extend towards the ground far enough to easily allow a patient in a wheel chair to be attached to the overhead support. Once the seated subject is attached, the cylinder can be moved back to raise the subject from a seated position to a standing position.

In practice, the sliding adjuster plate 16 can be physically locked into its required position. When used in this manner, the servo motor 20 initially positions the sliding adjuster plate but is not part of the control loop thereafter. In other situations, the sliding adjuster plate can move and be part of the control loop.

Once the computer 12 is operational, the electronic control valve 14 will apply pressure to the control cylinder 8, moving the piston in the appropriate direction until the center position is reached (this is the position where the control cylinder 8 will have the maximum range of motion during walking or running). After this event, the control cylinder 8 is locked in place and the servo motor 20 is commanded to extend such that the control cylinder 8 is positioned as required to enable the cable 4 to be clipped into the support harness worn by the user. Once the user is properly positioned, the servo motor 20 can be activated to slowly erect the user to the desired standing position—this is the position where the desired level of support is read by the load cell 10. An adjustable relief valve 22 can be set to ensure that the user is protected from surges that may arise. The desired percent of support weight can then be input to the computer 12, which will then obtain feedback from the load cell 10 and the electronic control valve 14 to achieve the desired result. At this time the control cylinder 8 can be unlocked allowing it to move in the appropriate directions to achieve the appropriate support levels. Limit switches 24 and 26 can be used to alert the computer when the endpoints of the control cylinder are being approached, at these events the servo motor 20 can be used to re-position the control cylinder 8 so that the center of the range of motion during walking or running moves closer to the midpoint position of the control cylinder 8. A treadmill 28 can then be commanded as required and the user can begin stepping. The system continually monitors the load cell 10 and makes adjustments via the electronic control valve 14.

A first stop 30 is a dampened "SOFT" stop providing a cushioned deceleration in the event of any failure in the sliding mechanism/attachments. A second stop 32 providing deceleration in the opposite direction can be spring loaded.

In accordance with particular embodiments, a secondary control loop and associated software is utilized whereby the servo-motor 20 can attempt to adjust for positional changes to compensate for a patient slowly moving toward the ground (which among other factors, affects the forces on the patients feet), or to compensate for changes in desired body weight support levels which exceed the limit in such changes inherent to the length on the control cylinder 8. It can do so by manipulating the sliding adjuster plate 16. The computer 12 can compensate for the cylinder position by adjusting the pressure appropriately. If necessary, the computer can either slow or stop the treadmill motion. During this correction the subject would be gently lifted back to the required position. The advantages of this set up are an automatic and smooth correction of therapy without the need for additional therapists to lift and readjust the patient.

A pressure sensor 34 can be monitored for the rate of change of pressure levels and for safety. In particular embodiments, the pressure sensor can be placed within the control cylinder 8 to send information about cylinder pressure to the computer 12. The computer 12 can receive feedback from the load cell 10 and/or the pressure sensor 34 and regulate support force accordingly. The pressure sensor can act as a comparator (check and verify), or as a supplement to the load cell readings. Preferably, the pressure sensor is a pressure transducer.

In the embodiment of FIG. 1, the control cylinder 8 is mounted horizontally to the treadmill surface. Alternatively, the cylinder can be mounted vertically, with the cable 4 running horizontally over a second pulley and attaching to the vertical cylinder. Also, the control cylinder 8 can be mounted directly to the servo motor 20 without the use of the adjuster plate 16.

The control cylinder in FIG. 1 is a double-rod cylinder. Alternatively, the control cylinder can be a single rod cylinder or a rod-less cylinder.

In further embodiments, the control cylinder can be replaced with an "artificial muscle". As is well known in the art, an "artificial muscle" employs an approach to precise and repeatable linear displacement technology using the concept of material deformation and flexure to achieve linear motion. The basic concept involves the wrapping of a watertight, flexible hose with non-elastic fibers arranged in a rhomboidal fashion. This results in a three-dimensional grid pattern, and when compressed air is introduced into the system, the grid pattern is deformed. A pulling force is generated in the axial direction, resulting in a shortening of the "muscle" as internal pressure is increased.

In other embodiments, the servo motor 20 can be replaced with a fluid-operated cylinder for moving the adjuster plate 16. Preferably, the fluid-operated cylinder is a pneumatic cylinder or a hydraulic cylinder. Control algorithms can regulate the pressure of the fluid-operated cylinder to contribute to the regulation of the forces exerted on a user.

For additional flexibility and safety, a treadmill controller 36 and an emergency stop 38 for the treadmill can be added to the system.

In particular embodiments, the limit switches can be replaced with a linear transducer. Additionally, a direct drive means can replace the compressed air/gas/hydraulic part of the system.

The present invention may be better understood by referring to the accompanying example involving a specific embodiment of this invention. This example is intended for illustration purposes only and should not in any sense be construed as limiting the scope of the invention as defined in the claims appended hereto.

EXAMPLE

1. Introduction

This example is a comparison of body weight support systems. Locomotor training using body weight support (BWS) on a treadmill and manual assistance has emerged as a potential rehabilitation intervention for the recovery of walking following spinal cord injury (SCI). The success of this approach is dependent on providing appropriate sensory cues to the spinal cord by simulating the kinetics and kinematics of over-ground walking. Several different BWS systems have been used to accomplish the unweighting component of this training (i.e., a winched rope, a pneumatic lift, stretched springs or counter-balanced weights). The type of BWS system used in locomotor training may affect ground reaction forces (GRF) and center of mass (COM) movement during gait which in turn could modulate afferent information. The purpose of this study was to compare the effects of two BWS systems, a position control system and a open—loop force control system, on limb loading, (COM) movement and motor control during locomotor training.

2. Subjects

Two non-disabled (ND) and two clinically complete (see reference 18) SCI subjects participated in the study. Informed consent was obtained from all subjects and the experiments were approved by the University of California, Los Angeles Human Subjects Protection Committee.

3. Equipment

Ground reaction forces (GRF) were collected during stepping using pressure sensing insoles. BWS force was collected from a force transducer placed in series with the BWS system cable. Center of mass (COM) movement was estimated from 6 dimensional recordings of pelvis movement. Three different BWS systems were used to support the subject's body weight during locomotion: 1) Position Control System; 2) Open—Loop Force Control System; 3) Closed—Loop Force Control System. EMG data was collected from lower limb muscles.

4. Procedure

All subjects stepped on a treadmill at a range of speeds (0.5-1.34 m/s) and levels of BWS (0-100% body weight) on both the position control system and the open—loop force control system. SCI subjects were provided with manual assistance as needed. COM movement, GRF, BWS force and EMG were analyzed. Following the analysis, a dynamic force control BWS system was designed to minimize any fluctuations in BWS force during locomotion. One of the ND subjects repeated the procedure on the closed—loop force control system.

5. Results and Conclusions

A. Position Control BWS System

Restricts vertical COM movement.

Stiffness of system results in large fluctuations in BWS force and loss of heel strike and toe-off peaks.

B. Open—Loop Force Control BWS System

Allows vertical COM movement similar to over-ground locomotion.

BWS force fluctuates with COM movement.

GRF had both heel strike and toe-off peaks, however heel strike peaks were higher and toe-off peaks were lower than expected.

C. Closed—Loop Force Control BWS System

Allows vertical COM movement similar to over-ground locomotion.

Of the three systems it showed more control of fluctuations in BWS force during locomotion.

GRF showed distinct heel strike peak, toe-off peak, and unloading at midstance. Amplitude of all three of these components were comparable to over ground gait adjusted for BWS.

D. The interaction between the BWS systems and COM movement/GRF occur for both the ND and SCI subjects.

E. Kinetics and kinematics during locomotor training become more comparable to over-ground walking as deviations in BWS force during gait are controlled and minimized. (Closed—loop force control system.)

F. The BWS system used in locomotor training effects both COM movement and GRF which modulates efferent motor output.

REFERENCES

The following publications are hereby incorporated by reference:

1. Barbeau, Wainberg, Finch, Description and application of a system for locomotor rehabilitation. Med & Biol. Eng & Comput. 1987, 25, 341-344
2. Behrman, A. L., Harkema, S. J. Locomotor training after human spinal cord injury: a series of case studies. Phys Ther. 80:688-700. 2000.

3. Cavagna, G A; Willems, P A; Heglund, N C. The role of gravity in human walking: pendular energy exchange, external work and optimal speed. Journal of Physiology. 2000, 528.3 pp. 657-668.
4. Cavagna, G A; Willems, P A; Heglund, N C. Walking on Mars. Nature. June 1998 Vol 393.18
5. Chang, Y H; Huang, H W; Hamerski, C M; Kram, R. The independent effects of gravity and inertia on running mechanics. Journal of Experimental Biology, January 2000, 203 Pt 2:229-38.
6. Davis, B L; Cavanagh, P R; Sommer, H J 3rd; Wu, G. Ground reaction forces during locomotion in simulated microgravity. Aviation Space and Environmental Medicine, March 1996, 67(3):235-42.
7. Dietz, V; Wirz, M; Curt, A; Colombo, G. Locomotor pattern in paraplegic patients: training effects and recovery of spinal cord function. Spinal Cord, June, 1998 36(6):380-90.
8. Dietz, V., Nakazawa, K., Wirz, M., Erni, Th., Level of spinal cord lesion determines locomotor activity in spinal man. Exp. Brain Res. 128:405-409. 1999.
9. Donelan, J M; Kram, R. The effect of reduced gravity on the kinematics of human walking: a test of the dynamic similarity hypothesis for locomotion. Journal of Experimental Biology, December, 1997 200 (Pt 24):3193-201.
10. Farley, C T; McMahon, T A. Energetics of walking and running: insights from simulated reduced-gravity experiments. Journal of Applied Physiology, December, 1992 73(6):2709-12.
11. Flynn, T W; Canavan, P K; Cavangah, P R; Chiang, J.-H. Plantar pressure reduction in an incremental weight—bearing system. Physical Therapy. 1997; 77: 410-416.
12. Gazzani, F., Fadda, A., Torre, M., Macellari, V. WARD: A pneumatic system for body weight relief in gait rehabilitation. IEEE Trans Rehabil Eng. December 2000; 8(4):506-13.
13. Griffen, T M; Tolani, N A; Kram, R. Walking in simulated reduced gravity. Journal of Applied Physiol. 1999 86(1): 383-390.
14. Harkema, S. J., Hurley, S. L., Patel, U. K., Requejo, P. S., Dobkin, B. H., Edgerton, V. R. Human lumbosacral spinal cord interprets loading during stepping. J. Neurophysiol. 77: 797-811, 1997.
15. He, J; Kram, R; McMahon, T A. Mechanics of running under simulated low gravity. Journal of Applied Physiol. 1991, 71(3); 863-870.
16. Hewes, D E. Reduced-gravity simulators for studies of man's mobility in space and on the moon. Human Factors, October, 1969 11(5):419-31.
17. Kram, R; Domingo, A; Ferris, D P. Effect of reduced gravity on the preferred walk-run transition speed. Journal of Experimental Biology, February, 1997 200 (Pt 4):821-6.
18. Maynard, F. M., Bracken, M. B. Creasey, G., et. al. International standards for neurological and functional classification of spinal cord injury. American Spinal Injury Association. Spinal Cord. 35:266-274, 1997.
19. Moran, M J. Reduced-gravity human factors research with aircraft. Human Factors, October, 1969 11(5):463-71.
20. Newman, D. J., Alexander, H. L. & Webbon, B. W. (1994). Energetics and mechanics for partial gravity locomotion. Aviation Space and Environmental Medicine 65, 815-823
21. Patel, U K; Dobkin, B H; Edergton, V R; Harkema, S J. The response of neural locomotor circuits to changes in gait velocity [abstract]. Soc Neurosci. 1998; 24: 2104.
22. Trout, O F Jr; Bruchey, W J Jr. Water immersion reduced-gravity simulation. Human Factors, October, 1969 11(5):473-87.
23. Wernig, A., Muller, S. Laufband locomotion with body weight support improved walking in persons with severe spinal cord injuries. Paraplegia 30:229-238, 1992

The invention claimed is:

1. A closed-loop support system for supporting the weight of a subject, comprising;
   a flame;
   a lift line supported by the frame, wherein said lift line consists of a single strand, and said lift line having a load bearing end;
   a harness connected to the load bearing end of the lift line, for receiving the subject;
   means for advancing and retracting the lift line, in which the advancing and retracting means is slidably moveable relative to the frame; and
   a closed-loop control system configured to monitor load on the lift line and in response to load information, to regulate lift line advancement and retraction and thereby control the amount of support provided to the subject, in which the control system comprises:
   a load sensor;
   an activator for activating the advancing and retracting means; and
   a controller receiving load information from the sensor and in response, sending control signals to the activator, and a pressure sensor, and wherein the controller receives information from the pressure sensor and in response, sends control signals to the activator.

2. A closed-loop support system for supporting the weight of a subject, comprising:
   a frame;
   a lift line supported by the frame, wherein said lift line consists of a single strand, and said lift line having a load bearing end;
   a harness connected to the load bearing end of the lift line, for receiving the subject;
   means for advancing and retracting the lift line, in which the advancing and retracting means is slidably moveable relative to the frame; and
   a closed-loop control system configured to monitor load on the lift line and in response to load information, to regulate lift line advancement and retraction and thereby control the amount of support provided to the subject, in which the control system. comprises:
   a load sensor;
   an activator for activating the advancing and retracting means; and
a controller receiving load information from the sensor and in response, sending control signals to the activator, and a pressure sensor, and wherein the controller receives information from the pressure sensor and in response, sends control signals to the activator, in which the pressure sensor is a pressure transducer.

3. A closed-loop system for supporting the weight of a subject, comprising:
   a frame;
   a cable supported by the frame, said cable having a load bearing end;
   a harness connected to the load bearing end of the cable, for receiving the subject;
   a fluid-operated cylinder for advancing and retracting the cable, said cylinder being moveably mounted to the frame;

a servo motor for moving said cylinder relative to the frame; and a control system configured to monitor load on the cable and in response to load information, to regulate cable advancement and retraction and thereby control the amount of support provided to the subject, said control system comprising:

a load cell, a control valve operatively connected to the cylinder, and a controller receiving load information from the load cell and in response, sending control signals to the control valve.

4. A closed-loop system for supporting the weight of a subject, comprising:

a frame;

a cable supported by the frame, said cable having a load bearing end;

a harness connected to the load bearing end of the cable, for receiving the subject;

a fluid-operated cylinder for advancing and retracting the cable, said cylinder being moveably mounted to the frame;

means for slidably moving said cylinder relative to the frame; and a closed-loop control system configured to monitor load on the cable and in response to load information, to regulate cable advancement and retraction and thereby control the amount of support provided to the subject, said control system comprising:

a load cell, a control valve operatively connected to the cylinder, and a controller receiving load information from the load cell and in response, sending control signals to the control valve, in which the control system further comprises a pressure transducer, and wherein the controller receives information from the pressure transducer and in response, sends control signals to the control valve.

5. A closed-loop system for supporting the weight of a subject, comprising:

a frame;

a cable supported by the frame, said cable having a load bearing end;

a harness connected to the load bearing end of the cable, for receiving the subject;

a fluid-operated cylinder for advancing and retracting the cable, said cylinder being moveably mounted to the frame;

means for moving said cylinder relative to the frame; and a control system configured to monitor load on the cable and in response to load information, to regulate cable advancement and retraction and thereby control the amount of support provided to the subject, said control system comprising:

a load cell, a control valve operatively connected to the cylinder, and a controller receiving load information from the load cell and in response, sending control signals to the means for moving.

6. A system for locomotor training of a subject, comprising:

a moveable surface located so as to be below and adjacent, or touching, one or both feet of the subject; and a closed-loop suspension assembly for suspending a subject over the moving surface, the assembly comprising:

a frame;

a cable supported by the frame, said cable having a load bearing end;

a harness connected to the load bearing end of the cable, for receiving the subject;

a fluid-operated cylinder for advancing and retracting the cable, said cylinder being moveably mounted to the frame;

a servo motor for moving said cylinder relative to the frame; and a control system configured to monitor load on the cable and in response to load information, to regulate cable advancement and retraction and thereby control the amount of support provided to the subject, said control system comprising:

a load cell, a control valve operatively connected to the cylinder, and a controller receiving load information from the load cell and in response, sending control signals to the control valve.

7. The system of claim 6 in which the control system further comprises a pressure transducer, and wherein the controller receives information from the pressure transducer and in response, sends control signals to the control valve.

* * * * *